United States Patent
Hollweg (10) Patent No.: US 11,264,809 B2
(45) Date of Patent: Mar. 1, 2022

(54) METHOD FOR OPERATING AN ENERGY STORAGE SYSTEM AND ENERGY STORAGE SYSTEM

(71) Applicant: Bayerische Motoren Werke Aktiengesellschaft, Munich (DE)

(72) Inventor: Tobias Hollweg, Shenyang (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 175 days.

(21) Appl. No.: 16/398,704

(22) Filed: Apr. 30, 2019

(65) Prior Publication Data

US 2019/0255968 A1 Aug. 22, 2019

Related U.S. Application Data

(63) Continuation of application No. PCT/EP2018/051906, filed on Jan. 26, 2018.

(30) Foreign Application Priority Data

Feb. 1, 2017 (DE) ...................... 10 2017 201 622.1

(51) Int. Cl.
*H02J 7/00* (2006.01)
*B60L 50/60* (2019.01)
(Continued)

(52) U.S. Cl.
CPC ............ *H02J 7/0014* (2013.01); *B60L 50/60* (2019.02); *B60L 58/13* (2019.02); *B60L 58/22* (2019.02);
(Continued)

(58) Field of Classification Search
CPC .......... B60L 58/13; B60L 58/22; B60L 50/60; B60L 2240/547; B60L 2240/80; H02J 7/0014; H02J 2310/48; Y02T 10/70
See application file for complete search history.

(56) References Cited

U.S. PATENT DOCUMENTS

2010/0085009 A1 4/2010 Kang et al.
2011/0163720 A1 7/2011 Gonzales et al.
(Continued)

FOREIGN PATENT DOCUMENTS

| CN | 102203626 A | 9/2011 |
| CN | 102343831 A | 2/2012 |

(Continued)

OTHER PUBLICATIONS

International Search Report (PCT/ISA/210) issued in PCT Application No. PCT/EP2018/051906 dated May 11, 2018 with English translation (seven (7) pages).

(Continued)

*Primary Examiner* — David V Henze-Gongola
(74) *Attorney, Agent, or Firm* — Crowell & Moring LLP (57) ABSTRACT

A method for operating an energy storage system, which includes at least one energy store with a plurality of cells and is designed to supply an electric drive system of a vehicle is provided. The method includes identifying a reference cell from among the cells, and carrying out a first symmetrization procedure for the cells at a first point in time, at which the reference cell has a first reference charge state. The method also includes carrying out a second symmetrization procedure for the cells, if the following conditions a) and b) are met at a second point in time following the first point in time: a) the voltage difference between the voltage of the cell with the lowest voltage and the voltage of the cell with the highest voltage is greater than or equal to a specified voltage difference; and b) the reference state of charge of the reference cell at the second point in time lies within a specified state of charge range, the state of charge range being determined in such a way that it includes the first reference state of charge.

5 Claims, 6 Drawing Sheets

(51) Int. Cl.
    *B60L 58/22* (2019.01)
    *B60L 58/13* (2019.01)
(52) U.S. Cl.
    CPC ..... *B60L 2240/547* (2013.01); *B60L 2240/80* (2013.01); *Y02T 10/70* (2013.01)

(56) References Cited

U.S. PATENT DOCUMENTS

| | | | |
|---|---|---|---|
| 2012/0194134 A1 | 8/2012 | Kain | |
| 2013/0187611 A1* | 7/2013 | Suzuki | H02J 7/0018 |
| | | | 320/118 |
| 2014/0285152 A1 | 9/2014 | Becker et al. | |
| 2016/0099587 A1 | 4/2016 | Becker et al. | |

FOREIGN PATENT DOCUMENTS

| | | |
|---|---|---|
| CN | 102624043 A | 8/2012 |
| CN | 103683377 A | 3/2014 |
| CN | 104064832 A | 9/2014 |
| CN | 105480104 A | 4/2016 |
| DE | 10 2013 217 767 A1 | 3/2014 |
| DE | 10 2013 204 885 A1 | 9/2014 |
| DE | 10 2014 220 005 A1 | 4/2016 |

OTHER PUBLICATIONS

German-language Written Opinion (PCT/ISA/237) issued in PCT Application No. PCT/EP2018/051906 dated May 11, 2018 (six (6) pages).

German-language Search Report issued in counterpart German Application No. 10 2017 201 622.1 dated Nov. 20, 2017 with partial English translation (11 pages).

Chinese Office Action issued in Chinese application No. 201880003984.5 dated Sep. 29, 2021, with English translation (Twelve (12) pages).

* cited by examiner

METHOD FOR OPERATING AN ENERGY STORAGE SYSTEM AND ENERGY STORAGE SYSTEM

CROSS REFERENCE TO RELATED APPLICATIONS

This application is a continuation of PCT International Application No. PCT/EP2018/051906, filed Jan. 26, 2018, which claims priority under 35 U.S.C. § 119 from German Patent Application No. 10 2017 201 622.1, filed Feb. 1, 2017, the entire disclosures of which are herein expressly incorporated by reference.

BACKGROUND AND SUMMARY OF THE INVENTION

The invention relates to a method for operating an energy storage system and to an energy storage system.

Electric and hybrid vehicles have an energy storage system, which comprises one or a plurality of energy stores connected in series and/or in parallel, which each have at least two energy storage cells, referred to in the following as cells.

The charging and discharging procedure of an energy store is stopped as soon as the cell of the energy store with the weakest charge has reached its minimum cell voltage since this cell would be damaged and destroyed in the case of further charging. Along the same lines, the charging procedure of an energy store must be interrupted as soon as a cell of the energy store has reached its maximum voltage. The further charging of this cell would lead to overcharging and, thereby, to the destruction thereof. After an interruption of the charging and discharging procedure however, the other cells are also not further charged or discharged, although, possibly, they are still not fully charged or discharged. For this reason, the state of charge of the entire energy store is limited by the cell with the highest or the lowest voltage. In other words, the charging procedure of an energy store is limited by the "fullest" cell or the discharge procedure of the energy store is limited by the "emptiest" cell.

The state of charge (SOC) of a cell designates the percentage ratio between the current electrical charge of the cell to the maximum possible electrical charge of the cell.

In order to balance the different states of charge of the cells, a cell balancing is carried out. The objective of such a balancing procedure entails that each cell can be charged with the same electrical charge after the balancing procedure so that each cell is almost fully charged after charging the energy store and the capacities of the energy stores can be better utilized.

From the most recent background art, it is known that a balancing procedure is required due to this because, even though they have the same capacity and are of the same type, the cells have a certain self-discharging rate that varies from cell to cell. Due to the balancing procedure, the different states of charge of the cells are then balanced.

Furthermore, it is known from the most recent background art (e.g. DE 10 2014 220 005 A1) that the capacities of the individual cells deviate from each other, for example, due to production variance, aging or mixed constructions. Since the various capacities increase during the course of the service life of the energy store due to differences in the cell aging process and can result in a significant capacity different between the cells, a balancing procedure becomes necessary for an efficient utilization. Due to the balancing procedure, the states of charge of the individual cells are balanced with each other despite different self-discharging and, if applicable, different capacities.

In the case of the method known from the most recent background art, the balancing procedure is carried out at a certain cell voltage independently of the actual state of charge of the individual cells. Consequently, in the case of different cell capacities, it is not taken into consideration what electrical charge can be actually charged or discharged during the next charging and discharging procedure until the specified end criterion (e.g. state of charge of the cell or the cell voltage limit) is achieved. Due to the capacity variance between the cells, a natural voltage difference, a so-called (voltage) asymmetry arises after each charging pass that has occurred. The (voltage) asymmetry is balanced, for example, by charges being taken from the cells by cell balancing. This occurs although the cells would not be asymmetrical from an energy point of view. By taking charges, a (voltage) asymmetry newly arises, a so-called bogus asymmetry if the state of charge of the previous balancing is started and a balancing procedure is carried out again. The result is an unnecessary energy loss due to unnecessary discharging procedures as well as a range loss since the energy store can no longer be fully charged and the discharging limit is reached earlier on.

Therefore, the object of the invention is to indicate a method for operating an energy storage system, and an energy storage system, using which unnecessary energy losses can be avoided during charging and discharging procedures.

This and other objects are achieved by way of the features of the independent and dependent claims. It is pointed out that additional features of a patent claim dependent on an independent patent claim without the features of the independent patent claim or only in combination with a subset of features of the independent patent claim can form an intrinsic invention independent of the combination of all features of the independent patent claim, which can be made into a subject of an independent claim, a divisional application or a subsequent application. In the same way, this applies to technical doctrines described in the description, which can form an invention independent of the features of the independent patent claims.

In the case of the method according to the invention for operating an energy storage system, which includes at least one energy store with a multiplicity of cells and which is designed to power an electric drive of a vehicle, a reference cell is initially determined from the cells. An electric drive is a drive of a vehicle with one or a plurality of electric motors.

The cells can be connected in series or in parallel. The cells can, for example, be lithium-ion cells, however, without being limited to this.

An energy storage system in accordance with the present application includes at least two energy stores connected in series and/or in parallel, which each include at least two energy storage cells, referred as cells in the following. In the context of the present application, an energy store is understood to mean a device for storing energy, which is then provided for later use. A preferred example for such an energy store is an accumulator or a high-voltage battery, as it is used, for example, in electric or hybrid vehicles.

The reference cell is selected from the number of cells of the energy store according to certain criteria, which concern the state of charge or the open-circuit voltage (OCV) of the cells. Preferably, the very cell from the number of cells of the energy store is determined to be a reference cell, which has the lowest state of charge at this point in time (basis point in time t0).

In the following, under the term "voltage", the open-circuit voltage (OCV) is understood.

A first balancing procedure of the cells is carried out at a first point in time. At the first point in time, the reference cell has a state of charge, which is referred to as a first reference state of charge in the following.

Preferably, the first point in time follows the basis point in time, meaning the first point in time takes place later than the basis point in time.

A balancing procedure in accordance with the present application can be carried out according to common methods for balancing cell states of charge. For example, the balancing of the states of charge of the cells can be achieved via discharging individual cells with a resistor. Thereby, all cells are discharged to the voltage level of the cells with the lowest open-circuit voltage.

A second balancing procedure of the cells is then carried out if the following conditions a) and b) are met at a second point in time following the first point in time: a) the voltage difference of the voltage of the cell with the lowest voltage and the voltage of the cell with the highest voltage is greater or equal to a specified voltage difference; and b) the reference state of charge of the reference cell at the second point in time is within a specified state-of-charge range, wherein the state-of-charge range is determined in such a way that it contains the first reference state of charge.

For condition a), the cell with the lowest open-circuit voltage and the cell with the highest open-circuit voltage is determined from the number of cells. The voltage difference is ascertained by determining the difference between the lowest open-circuit voltage and the highest open-circuit voltage. If the voltage difference is the same or greater than a specified voltage difference, condition a) is met. The specified voltage difference varies depending on the type of cell used and the measurement accuracy of the cell voltages. In accordance with an embodiment, the specified voltage difference is 30 mV, preferably 10 mV and, being furthermore preferred, 8 mV.

For condition b), a state-of-charge range is specified, and it is checked if the state of charge of the reference cell (reference state of charge) is within this specified state-of-charge range at the second point in time. In other words, it is compared if the reference state of charge is within the specified state-of-charge range or out of the state-of-charge range at the second point in time.

Under a state-of-charge range, a range is understood, which includes a lower state-of-charge limit and an upper state-of-charge limit. Thereby, that means that the range is limited by a lower state-of-charge value and an upper state-of-charge value. For condition b), the reference state of charge of the reference cell at the second point in time is determined and it is compared if this value is in the specified state-of-charge range, meaning it is compared if the reference state of charge of the reference cell at the second point in time is greater than or equal to the lower state-of-charge value and smaller than or equal to the upper state-of-charge value.

The reference state of charge of the reference cell at the second point in time is determined according to one of the known methods. For example, the reference state of charge of the reference cell can be determined via the correlation of the open-circuit voltage of a cell to its state of charge.

According to the invention, the state-of-charge range is determined in such a way that it contains the first reference state of charge. This means that the state-of-charge range indicates a range that contains state-of-charge values, under which the first reference state of charge falls. In other words, the state-of-charge range corresponds to the first reference state of charge plus a tolerance range, wherein the tolerance range contains state-of-charge values that are smaller than the first reference state of charge and/or greater than the first reference state of charge.

The state-of-charge range is determined in such a way that the first reference state of charge is located within the range between the lower state-of-charge limit and the upper state-of-charge limit. In other words, the first reference state of charge is in a range, which is limited by a lower state-of-charge value and an upper state-of-charge value.

For example, the state-of-charge range is determined by the first reference state of charge and a tolerance range of +/−10%, preferably +/−5%. That means that the lower state-of-charge limit or the lower state-of-charge value is equal to the first reference state of charge −10%, preferably −5% and the upper state-of-charge limit or the upper state-of-charge value is +10%, preferably +5%.

In other words, the second balancing procedure is only carried out if the reference state of charge of the reference cell at the second point in time reaches a value that corresponds to the first reference state of charge or to the first reference state of charge plus a tolerance range.

The second balancing procedure is then immediately carried out if conditions a) and b) are met at the second point in time. That means that the second balancing procedure is carried out at or shortly after the second point in time. For the sake of simplicity, it is assumed in the following that the second balancing procedure is carried out at the second point in time.

The balancing procedures of the cells described above can either be carried out with all cells of an energy store or with single individually selected cells and subsets of the cells.

In the case of the method according to the invention, the second balancing procedure is not already carried out if the difference of the voltage difference between the cell with the lowest voltage and the cell with the highest voltage exceeds a certain value, but only when the current state of charge of the reference cell is within a state-of-charge range, in which the first balancing procedure has been carried out. In other words, the second balancing procedure is only allowed if the reference state of charge of the reference cell is in a range near the first reference state of charge, meaning near the state of charge during the first balancing procedure.

Thereby, it is avoided that balancing takes place due to the occurrence of bogus asymmetries due to capacity differences of the individual cells. Altogether, due to this, the number of balancing procedures is reduced, whereby the overall energy loss is reduced. Furthermore, due to the reduced overall balancing time, the component load of the energy store is reduced.

In accordance with an embodiment of the method according to the invention, the second balancing procedure of the cells is carried out up until a maximum time duration is reached, which extends from a first point in time up to a specified maximum point in time, if the conditions a) and b) are met. Upon reaching the maximum point in time, the second balancing procedure of the cells is carried out if the conditions a) and b) are met or if only condition a) is met. With the term "up until reaching a maximum time duration", a time span is referred to, which extents up until the specified maximum point in time but does not contain this.

This means that after a specified maximum time duration has passed, meaning from the maximum point in time, it is not necessary to wait so long with the second balancing procedure until condition b) is met, but rather, that if condition a) is met, the second balancing procedure is immediately carried out upon achieving the maximum point in time.

In accordance with another embodiment of the method according to the invention, the second balancing procedure of the cells is carried out if conditions a) and b) are met at the second point in time or if conditions a) and c) are met at the second point in time, wherein condition c) is defined as follows: the reference state of charge of the reference cell at the second point in time is greater than the specified state-of-charge range and, from a balancing assessment procedure, it results that a balancing quality of the second balancing procedure for the reference state of charge of the reference cell at the second point in time increases in comparison to a balancing quality of the second balancing procedure for a reference state of charge within the specified state-of-charge range.

With the expression "greater than the specified state-of-charge range", values for the reference state of charge are intended, which are above the specified state-of-charge range, meaning that the values are outside of the specified state-of-charge range and greater than the values for the reference state of charge that are within the specified state-of-charge range.

This means that it is not necessary to wait with the second balancing procedure until the reference state of charge of the reference cell has dropped to the extent that it is within the specified state-of-charge range, but already then carried out when it is assessed that the balancing quality for the reference state of charge of the reference cell at the second point in time is higher in comparison to a balancing quality for a reference state of charge within the specified state-of-charge range. In other words, the second balancing procedure is always possible if the reference state of charge of the reference cell at the second point in time is within the specified state-of-charge range or if the reference state of charge of the reference cell at the second point in time is above the state-of-charge range and the balancing quality is assessed for this reference state of charge as being higher.

The balancing quality is a measured parameter in order to determine the difference in charge between the individual cells. A high balancing quality means that a low difference in charge exists between the cells. A low level of balancing quality means that a large difference in charge exists between the cells.

The assessment of the balancing quality, for example, takes place based on a specified state-of-charge OCV curve (OCV curve) of the reference cell and their discharge. With the aid of the knowledge of the voltage difference for a certain state of charge of the reference cell and the gradient of the state-of-charge OCV curve (mathematical derivation of the OCV curve), the balancing quality is assessed. According to this, in the case of an identical voltage difference, the balancing quality is higher if the gradient of the OCV curve is high. In the case of an identical gradient of the OCV curve, the balancing quality is higher if the voltage difference is low.

In accordance with another embodiment of the method according to the invention, the first balancing procedure and the second balancing procedure are carried out during a resting phase of the energy storage system. That means that only when the energy storage system or the energy store is in a resting phase is the balancing of the cells carried out.

A resting phase of the energy storage system is typically present if the vehicle is in idling mode, meaning when the vehicle is not moving. A typical example for this is a switch-off procedure of the vehicle. A switch-off procedure is defined by the simultaneous non-usage of the energy storage system and of the drive motor.

The first or the second balancing procedure, for example, is carried out after 30 minutes, preferably after 15 minutes, after the energy storage system is burdened, for example, being discharged or charged.

In accordance with another embodiment of the method according to the invention, the specified maximum time duration is defined depending on the number of resting phases of the energy storage system. In the case of this embodiment, all resting phases of the energy storage system are taken into account, independently of if the reference state of charge of the reference cell is within or outside of the specified state-of-charge range during the resting phase.

In accordance with another embodiment, the specified maximum time duration is defined depending on the number of resting phases of the energy storage system, in which the reference state of charge is within the specified state-of-charge range. The higher the number of resting phases of the energy storage system, in which the reference state of charge is within the specified state-of-charge range, the longer the specified maximum time duration is defined to be.

In accordance with another embodiment, the specified maximum time duration is defined depending on the number of resting phases of the energy storage system, in which the reference state of charge is outside the specified state-of-charge range. The higher the number of resting phases of the energy storage system, in which the reference state of charge is outside the specified state-of-charge range, the shorter the specified maximum time duration is defined to be.

For example, the specified maximum time duration is set at ten days. If the reference states of charge are outside of the specified state-of-charge range during the last five resting phases of the energy storage system, the specified maximum time duration is shortened to five days. If a resting phase is recorded after these resting phases, during which the reference state of charge is within the state-of-charge range, the specified maximum time duration is prolonged to 14 days.

In accordance with another embodiment of the method according to the invention, the reference cell is determined from the cells by a cell being selected from the cells that have the lowest state of charge. In other words, the very cell is determined from the total amount of cells, which has the lowest state of charge at the point in time of determining the reference cell.

In accordance with an embodiment, more than two balancing procedures of the cells are carried out. The balancing procedures following the second balancing procedure are thereby carried out in the same way as has been described above for the second balancing procedure. Thereby, the balancing procedure currently carried out at the point in time in question is classified as the "first balancing procedure" for the consideration of the successive balancing procedure. Thereby, the details described above for the first and second balancing procedure respectively apply for the successive other balancing procedures accordingly.

Based on an example, the process for carrying out a third, fourth, fifth, etc. balancing procedure should be illustrated.

Initially, in another selection procedure, another reference cell is selected from the cells; thereby, the other reference cell can be the same cell as the first reference cell. As an alternative, no other reference cell is selected but the first reference cell serves as another reference cell for all other balancing procedures. As has already been described above, the second balancing procedure is carried out at the second point in time. At the second point in time, the reference cell includes the second reference state of charge. According to the second balancing procedure, a third balancing procedure of the cells is carried out if the following conditions a1) and b1) are met at a third point in time following the second point in time:

a1) the voltage difference of the voltage of the cell with the lowest voltage and the voltage of the cell with the highest voltage is greater or equal to a specified voltage difference; and b1) the reference state of charge of the reference cell at the third point in time is within a specified state-of-charge range, wherein the state-of-charge range is determined in such a way that it contains the second reference state of charge.

Thereby, each further balancing procedure is coupled to the reference state of charge of the previous balancing procedure. In other words, another balancing procedure, among other things, is carried out if the reference state of charge is within the specified state-of-charge range, which contains the previous reference state of charge.

In summary, thereby, in accordance with another embodiment, a method for operating an energy storage system, which includes at least one energy store with a multiplicity of cells and which is designed to power an electric drive of a vehicle is described, wherein the method entails:

Carrying out a selection procedure of a reference cell from the cells;

Carrying out a first balancing procedure of the cells at a first point in time, at which the reference cell has a first reference state of charge;

Carrying out a second balancing procedure of the cells if the following conditions a) and b) are met at a second point in time following the first point in time:

a) the voltage difference of the voltage of the cell with the lowest voltage and the voltage of the cell with the highest voltage is greater or equal to a specified voltage difference; and b) the reference state of charge of the reference cell at the second point in time is within a specified state-of-charge range, wherein the state-of-charge range is determined in such a way that it contains the first reference state of charge;

Optionally carrying out a further selection procedure of another reference cell from the cells;

Carrying out an $n^{th}$ balancing procedure of the cells if the following conditions a1) and b1) are met at an $n^{th}$ point in time following the $(n-1)^{th}$ point in time, at which the reference cell or the other reference cell, if another selection procedure has been carried out, has an $n^{th}$ reference state of charge:

a1) the voltage difference of the voltage of the cell with the lowest voltage and the voltage of the cell with the highest voltage is greater or equal to a specified voltage difference; and b1) the reference state of charge of the reference cell at the $n^{th}$ point in time is within a specified state-of-charge range, wherein the state-of-charge range is determined in such a way that it contains the $(n-1)^{th}$ reference state of charge.

With the $n^{th}$ balancing procedure of the cells, each balancing procedure as of and including the third balancing procedure is intended.

In accordance with an embodiment, enough balancing procedures are carried out until the asymmetry between the cells has decreased, meaning until the voltage difference of the voltage of the cell with the lowest voltage and the voltage of the cell with the highest voltage has decreased to under a threshold value.

Another object of the present invention is furthermore an energy storage system, which is designed to power an electric drive of a vehicle and which includes a multiplicity of cells and a control unit. The control unit is designed to determine the reference state of charge of a reference cell, which is determined from the cells, to determine a voltage difference of the voltage of the cells, and to carry out a balancing procedure of the cells, and wherein the energy storage system is designed to carry out a method for operating an energy storage system in accordance with one of the embodiments described above.

The control unit is designed to determine the reference state of charge with the aid of known methods. For example, the control unit can be designed in such a way that it determines the state of charge corresponding to the voltage via a measurement of the OCV of the reference cell and a provided discharge curve of the reference cell.

The control unit is furthermore designed to carry out a balancing procedure of the cells by balancing the states of charge of the cells. For this reason, the energy storage system is, for example, equipped with at least one discharge resistor, preferably with a discharge resistor for each cell or for each of the cells connected in parallel in order to discharge each of the cells to be balanced. Via a switching logic, the respective discharge resistor or the respective discharge resistors can be controlled in order to discharge the respective or the respective cell(s) and, by way of this, balance the cells.

In accordance with an embodiment, the control unit is integrated into an energy storage management system, which, for example, is used in electric or hybrid vehicles.

The subject of the present invention is furthermore a vehicle with an energy storage system in accordance with one of the embodiments described above. The vehicle is preferably an electric vehicle or a hybrid vehicle.

With regard to further technical features and advantages of the energy storage system according to the invention or of the vehicle according to the invention, reference is made to the explanations in connection with the method according to the invention, the figures and the figure descriptions.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
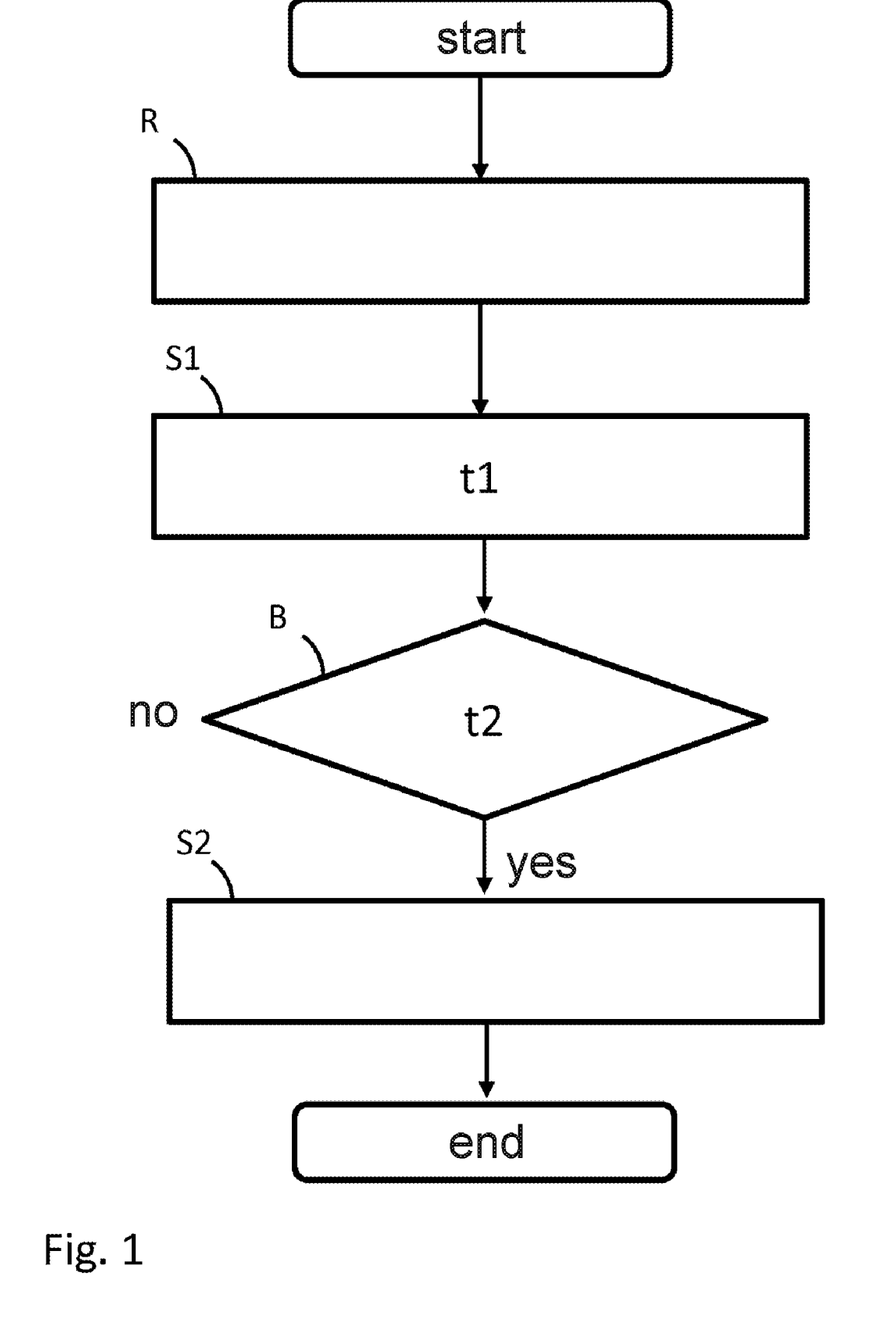
FIG. 1 is a flow chart, which represents a method according to the invention for operating an energy storage system.

FIG. 1 shows the procedure of the method according to the invention for operating an energy storage system. Initially, a reference cell is determined from the cells of the energy storage system; this procedure is identified with the reference symbol R. Preferably, this procedure is carried out at point in time t0 (basis point in time). A first balancing procedure S1 of the cells is carried out at a point in time t1. At a point in time t2, it is checked if conditions a) and b) have been met. This procedure is identified with the reference symbol B. If both conditions a) and b) are met, a second balancing procedure S2 is carried out. If one of the conditions a) and b) is not met, initially no further balancing procedure is carried out. Only when the conditions a) and b) are met is a new balancing procedure carried out.

In FIGS. 2 to 5, as an example, cells Z1 to Z6 of an energy store of an energy storage system are depicted. In the following, an embodiment of the method according to the invention for operating an energy storage system shall be described based on this.

Figure 2:
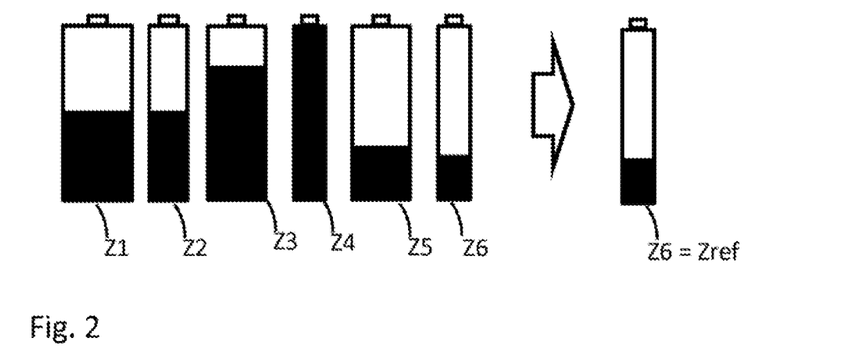
FIGS. 2 to 6 are schematic illustrations of a method for operating an energy storage system in accordance with an embodiment.
Figure 3:
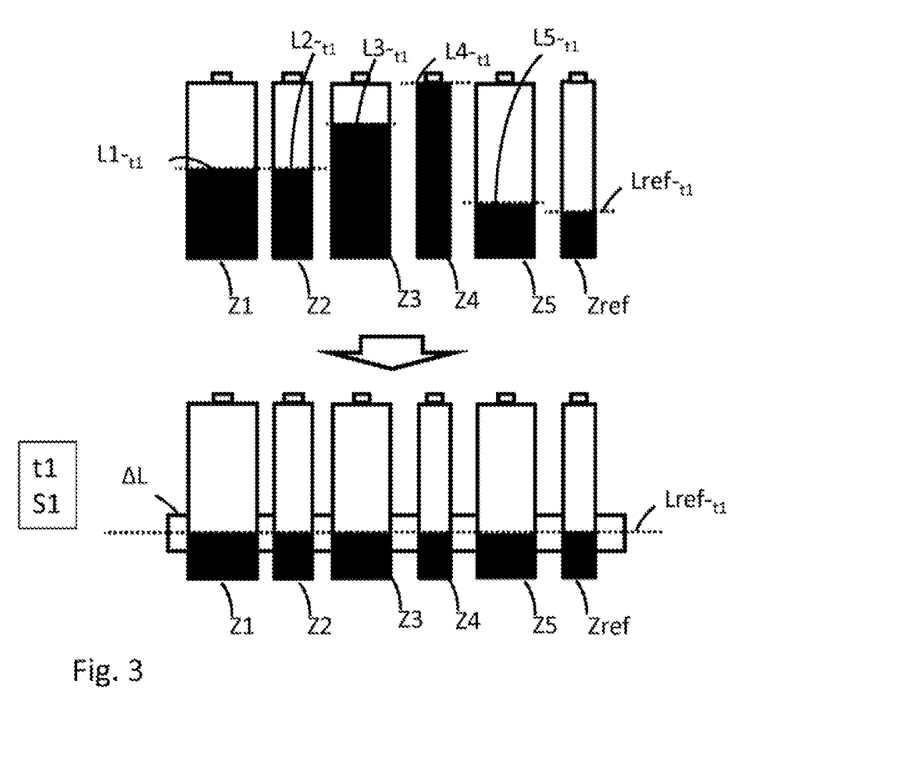
Figure 4:
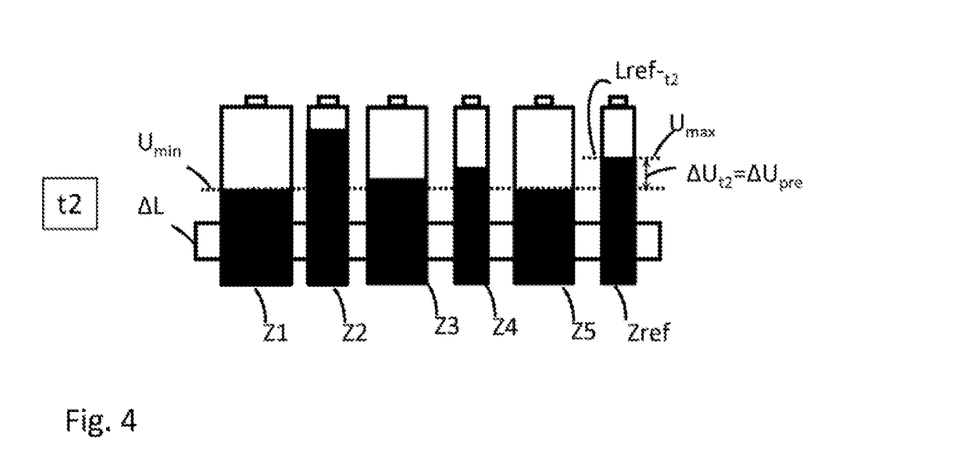
Figure 5:
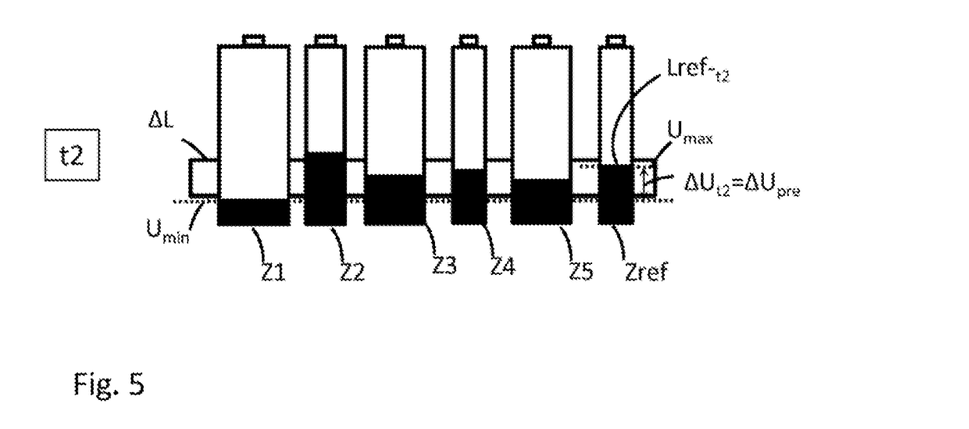

FIG. 2 shows six cells Z1 to Z6, which all have different states of charge. Initially, a reference cell Zref is determined from this. In the case of this embodiment, the very cell is defined as a reference cell Zref, which has the lowest state of charge. In FIG. 3, a first balancing procedure S1 is schematically shown at the point in time t1. Thereby, the states of charge $L1_{-t1}$, $L2_{-t1}$, $L3_{-t1}$, $L4_{-t1}$ and $L5_{-t1}$ of the cells Z1 to Z5 are balanced to the state of charge $Lref_{-t1}$ of the reference cell Zref. Due to the balancing procedure S1, all cells Z1 to Z5 and Zref have the same state of charge $Lref_{-t1}$. The state of charge $Lref_{-t1}$ furthermore serves to determine the state-of-charge range $\Delta L$. The state-of-charge range $\Delta L$ contains the state of charge $Lref_{-t1}$ and a tolerance range, which is formed starting from the state of charge $Lref_{-t1}$ all the way to higher and lower state-of-charge values. That means that the state-of-charge range $\Delta L$ contains states of charge that are greater than or equal to the state of charge $Lref_{-t1}$ and contains states of charge that are lower than or equal to the state of charge $Lref_{-t1}$. In FIG. 4, meeting condition a) is schematically shown. Condition a) is met when, at point in time t2, the difference, meaning the voltage difference $\Delta U_{t2}$ between the voltage of the cell with the lowest voltage $Up_{min}$ meaning cell Z1, and the voltage of the cell with the highest voltage $U_{max}$, meaning cell Zref, is greater than a specified voltage difference $\Delta U_{pre}$ or equal to a specified voltage difference $\Delta U_{pre}$. Since, in the depicted case, the voltage difference $\Delta U_{t2}$ is equal to the specified voltage difference $\Delta U_{pre}$, condition a) is met. Since the reference state of charge $L_{ref-t2}$ of the reference cell Zref is not within the specified state-of-charge range $\Delta L$ at the second point in time t2, condition b) is not met and, in the case of the constellation shown in FIG. 4, the second balancing procedure S2 is not carried out. In the constellation shown in FIG. 5, the reference state of charge $Lref_{-t2}$ of the reference cell Zref is decreased to the extent that it lies within the specified state-of-charge range $\Delta L$. Thereby, in addition to condition a), also condition b) is met and the second balancing procedure S2 is carried out. If the assessment of the balancing quality (condition c) is included into the conditions for the second balancing procedure, in the case of the constellation shown in FIG. 4, the second balancing procedure S2 would be carried out, nevertheless.

Figure 6:
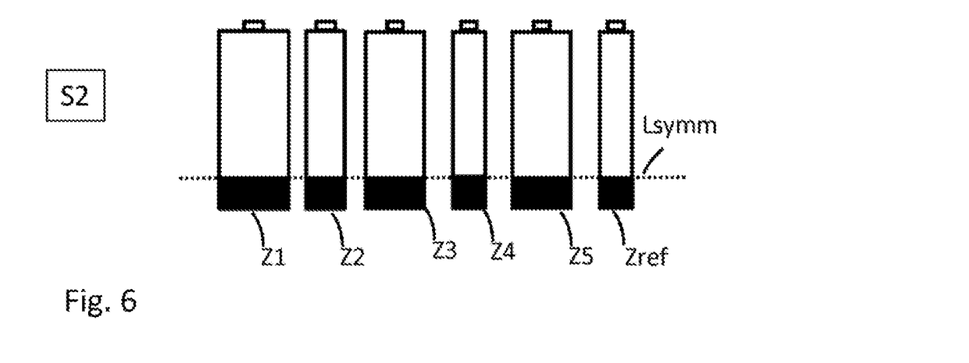

In FIG. 6, the cells Z1 to Z5 and Zref are shown after carrying out the second balancing procedure S2. The states of charge Lsymm of all cells Z1 to Z5 and Zref are identical. After the second balancing procedure S2, the process described above starts from the beginning. The cells Z1 to Z5 and Zref are charged or discharged depending on the load of the energy store or a new reference cell Zref is determined from the cells Z1 to Z6. Then, after determining the reference cell Zref, a third balancing procedure is then carried out, which is carried out according to the process described above of the first balancing procedure. Also, the successive fourth balancing procedure is carried out according to the process of the second balancing procedure described above.

In FIGS. 7 to 10, conditions a) and b) are described depending on the switch-off behavior of the vehicle, in particular, depending on the switch-off procedures of the vehicle, meaning the resting phases of the energy storage system, wherein it is respectively required that condition a) is met at each point in time. In FIGS. 7 to 10, the individual switch-off procedures $A_s$, A of the vehicle are identified with a star that is filled in or not filled in. In the following, embodiments of the method for operating an energy storage system shall be described as an example based on the reference cell. The respective state of charge (SOC) of this cell is plotted on the y-axis. The x-axis represents a time axis.

In FIGS. 7 to 10, the switch-off procedures of the vehicle where a balancing is performed are identified with $A_s$ or with a filled-in star. The switch-off procedures of the vehicle where no balancing is performed are identified with A or with a star that is not filled in. For the depicted balancing procedures $A_s$, it applies that these are then carried out if the state of charge of the reference cell is within the previously determined state-of-charge range $\Delta L$ at a determined point in time before the respective balancing procedure.

Figure 7:
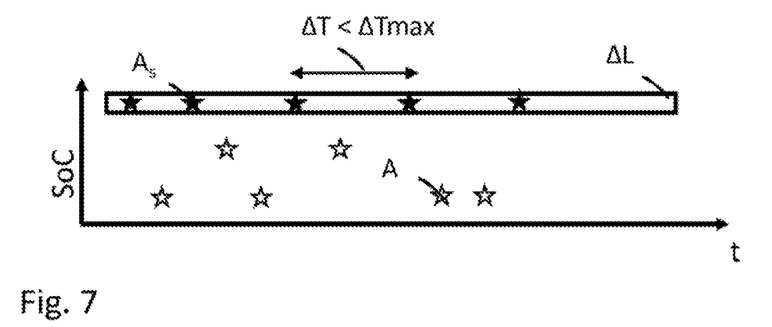
FIGS. 7 to 10 are schematic illustrations of embodiments of the method according to the invention for operating an energy storage system.

In FIG. 7, a switch-off behavior of the vehicle is shown where the cells of the energy store are balanced at regular intervals. Thereby, the duration $\Delta T$ between two successive balancing procedures $A_s$ is smaller than the specified maximum time duration $\Delta Tmax$. In the situation shown in FIG. 7, the state-of-charge range $\Delta L$ is the same for all balancing procedures. That means that the state-of-charge range $\Delta L$ for the second to the fifth balancing procedure is respectively determined in such a way that it contains the previous reference state of charge of the reference cell.

Figure 8:
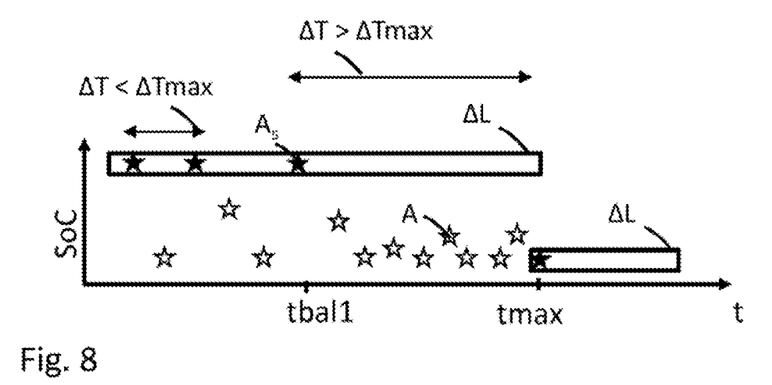

FIG. 8 describes a switch-off behavior of the vehicle where the cells are balanced at regular intervals up to a point in time tbal1, wherein the duration $\Delta T$ between two successive balancing procedures is smaller than the specified maximum time duration $\Delta Tmax$. Thereby, the situation corresponds to the situation shown in FIG. 7 up to the point in time tbal1. As of the point in time tbal1, the situation changes as follows: the duration between the points in time tbal1 and tmax is greater than the specified maximum time duration $\Delta Tmax$, which is why the balancing procedure is no longer dependent upon meeting conditions a) and b) at the point in time tmax but is carried out directly. As is shown in FIG. 8, in the case of exceeding the time duration $\Delta Tmax$, it is not waited for until the reference cell enters into the range of the reference state of charge of the previous balancing procedure, but balancing takes place directly at the point in time tmax. The reference cell is newly determined at the point in time tmax for the subsequent balancing procedure. The newly selected reference cell then corresponds to the cell with the lowest state of charge. In other words, by way of this, the state-of-charge range $\Delta L$ for the subsequent balancing procedure is shifted.

Figure 9:
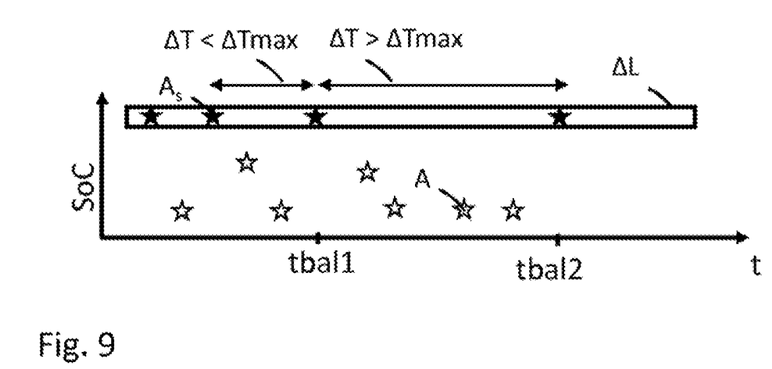

FIG. 9 basically shows the same switch-off behavior of the vehicle as is shown in FIG. 8, however, the number of switch-off procedures differs within the time period from tbal1 to tbal2. While in the situation shown in FIG. 8, a total of ten switch-off procedures occur in the period between tbal1 and tmax, which corresponds to the point in time tbal2 in FIG. 9, in the situation shown in FIG. 9, only six switch-off procedures take place within the period between tbal1 and tbal2. A situation shown in FIG. 9 could, for example, occur if the vehicle is only seldom moved during the holiday period and, thereby, also few switch-off procedures occur. Although the duration between the points in time tbal1 and tbal2 are greater than the specified maximum time duration ΔTmax, in the case of the situation depicted in FIG. 9, the state-of-charge range ΔL is determined in such a way that it contains the reference state of charge of the previous balancing procedure. That means that, in this case, it is waited with the balancing procedure long enough until the state of charge of the reference cell is near the reference state of charge of the previous balancing procedure.

Figure 10:
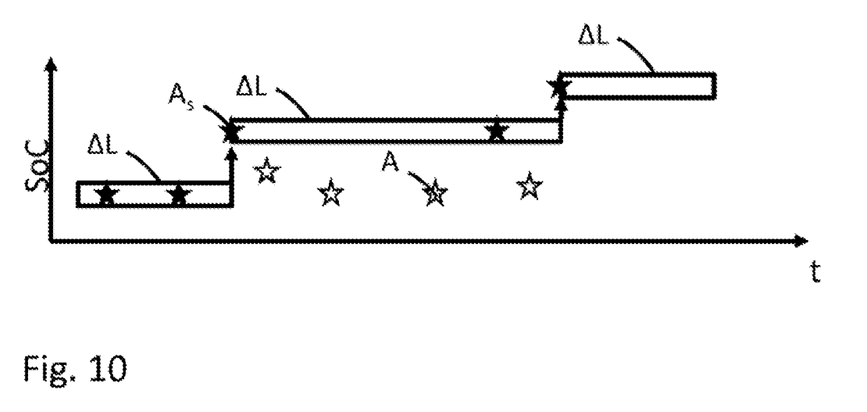

In FIG. 10, a situation is depicted where the state-of-charge range ΔL is determined depending on the assessed balancing quality of the subsequent balancing procedure. In the case of the situation depicted in FIG. 10, for the third switch-off procedure, no balancing procedure would be carried out because the reference state of charge for the third switch-off procedure is not within the state-of-charge range ΔL determined by the previous balancing procedure. However, due to an assessment procedure, for the third switch-off procedure, it results that the balancing quality when carrying out the balancing procedure in the case of the current reference state of charge for the third switch-off procedure is higher than the balancing quality of a balancing procedure for the state-of-charge range ΔL determined by the state of charge of the second switch-off procedure. Since, in addition, the current reference state of charge for the third switch-off procedure is higher than the determined state-of-charge range ΔL, the balancing procedure is carried out for the current reference state of charge for the third switch-off procedure. For the successive balancing procedures, the state-of-charge range ΔL is determined again depending on the assessed balancing quality. Since a balancing quality is assessed for the reference state of charge prevailing for the fourth switch-off procedure, which is lower than the balancing quality of the balancing procedure during the third switch-off procedure, the state-of-charge range ΔL remains at the previously determined level. In other words, the shifting of the state-of-charge range ΔL is only permitted if the reference state of charge is higher than is the case with the last balancing. Even if the balancing quality for the fourth switch-off procedure would be higher than is the case with the third switch-off procedure, no balancing would therefore be started. In the case of the ninth switch-off procedure, the situation occurs again that the assessed balancing quality for the reference state of charge prevailing during the ninth switch-off procedure is higher than the balancing quality of the previous balancing procedure and the reference state of charge prevailing during the ninth switch-off procedure is greater than the state-of-charge range ΔL, whereby the balancing procedure is carried out for the current reference state of charge for the ninth switch-off procedure. That means that the state-of-charge range ΔL is shifted in comparison to the previous balancing procedure.

Figure 11:
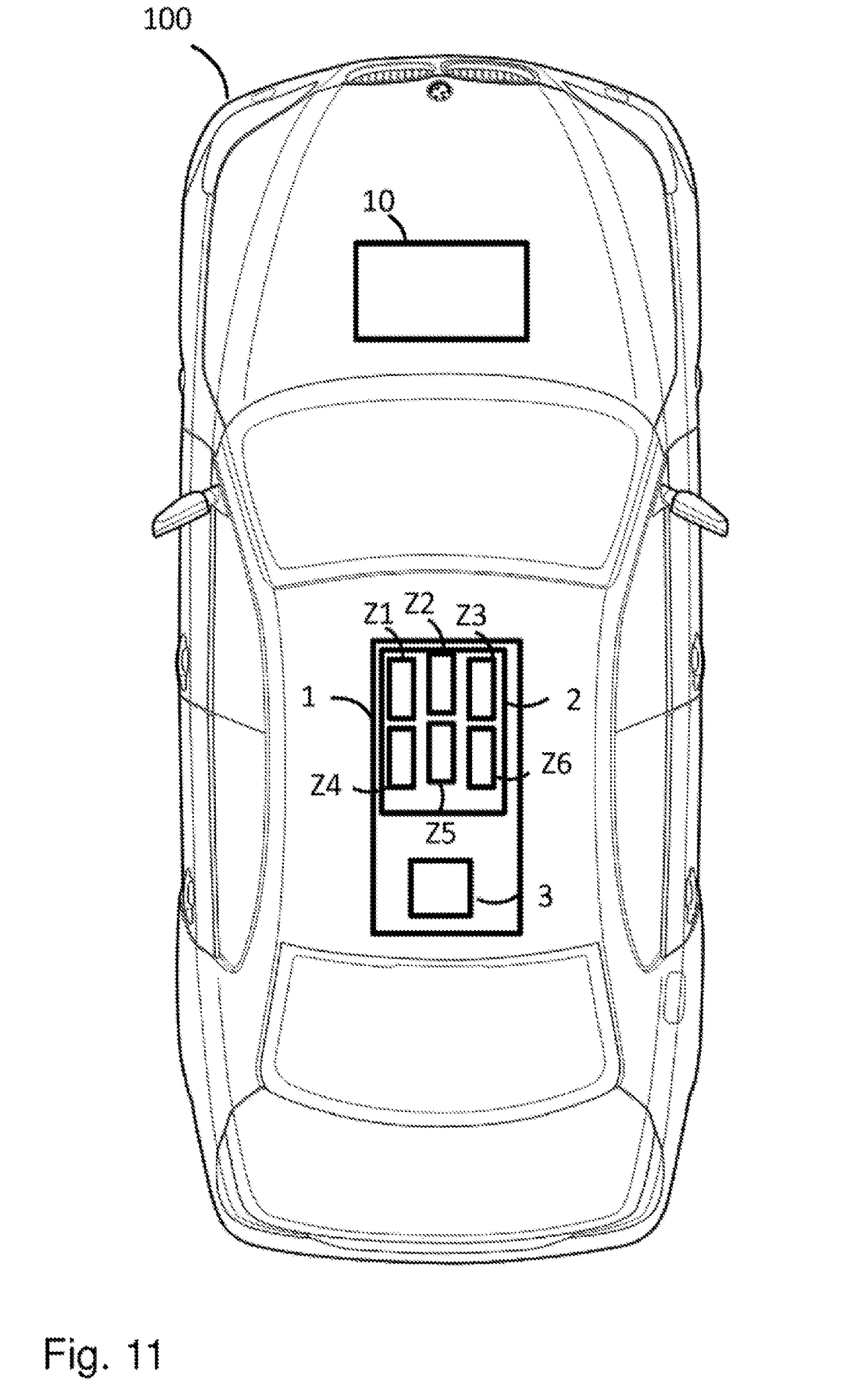
FIG. 11 is a schematic illustration of a vehicle with an energy storage system in accordance with an embodiment.

FIG. 11 shows a vehicle 100, which includes an energy storage system 1 and an electric drive 10. The energy storage system 1 is designed to feed the electric drive 10 of the vehicle 100. The energy storage system 1 includes a multiplicity of cells Z1 to Z6 and a control unit 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an energy storage system, which includes at least one energy store with a multiplicity of cells and which is designed to power an electric drive of a vehicle, the method comprising the acts of:
   carrying out a selection procedure of a reference cell from the cells;
   carrying out a first balancing procedure of the cells at a first point in time, at which the reference cell has a first reference state of charge; and
   carrying out a second balancing procedure of the cells if the following conditions a) and b) are met at a second point in time following the first point in time:
   a) a voltage difference between a voltage of a first cell with the lowest voltage and a voltage of a second cell with the highest voltage is greater or equal to a specified voltage difference; and
   b) a reference state of charge of the reference cell at the second point in time is within a state-of-charge range, wherein the state-of-charge range is determined in such a way that it contains the first reference state of charge,
   the second balancing procedure of the cells is carried out up until a predetermined maximum time duration is reached, which extends from the first point in time up to a predetermined maximum point in time if the conditions a) and b) are met, and
   upon reaching the predetermined maximum point in time, the second balancing procedure of the cells is carried out if the conditions a) and b) are met or if only the condition a) is met.

2. The method according to claim 1, wherein
   the second balancing procedure of the cells is then carried out if the conditions a) and b) are met at the second point in time or if the conditions a) and c) are met at the second point in time, wherein the condition c) is defined as follows:
   c) the reference state of charge of the reference cell at the second point in time is greater than the state-of-charge range, and
   from a balancing assessment procedure, it results that a balancing quality of the second balancing procedure for the reference state of charge of the reference cell at the second point in time increases in comparison to a balancing quality of the second balancing procedure for a reference state of charge within the state-of-charge range.

3. The method according to claim 2, wherein the first balancing procedure and the second balancing procedure are carried out during a resting phase of the energy storage system.

4. The method according to claim 3, wherein the predetermined maximum time duration is defined depending on a number of resting phases.

5. The method according to claim 2, wherein the reference cell is determined from the cells by a cell being selected from the cells that have the lowest state of charge.

* * * * *